United States Patent
Fortune et al.

(10) Patent No.: US 6,490,936 B1
(45) Date of Patent: Dec. 10, 2002

(54) BLADDER AND SUPPORT STRUCTURE FOR OCCUPANT WEIGHT ESTIMATION

(75) Inventors: Duane Donald Fortune, Lebanon, IN (US); Morgan Daniel Murphy, Kokomo, IN (US); Robert Joseph Myers, Russiaville, IN (US); Pamela Ann Roe, Kokomo, IN (US); Phillip E Kaltenbacher, II, Lafayette, IN (US); Stuart Stites Sullivan, Peru, IN (US); Gregory Allen Cobb, Kokomo, IN (US); Julia Ann Oberlin, Windfall, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/311,576

(22) Filed: May 14, 1999

Related U.S. Application Data

(63) Continuation-in-part of application No. 08/923,020, filed on Sep. 3, 1997, now Pat. No. 5,987,370.

(51) Int. Cl.[7] .................................................. G01L 1/02
(52) U.S. Cl. .................................................. 73/862.581
(58) Field of Search .................. 73/714, 713, 862.541, 73/862.581–862.584, 865; 177/45, 208, 209; 180/271, 282; 280/730.1, 734, 735, 742; 340/667

(56) References Cited

U.S. PATENT DOCUMENTS

| | | | | |
|---|---|---|---|---|
| 5,918,696 A | * | 7/1999 | VanVoorhies | |
| 5,957,491 A | | 9/1999 | Cech et al. | 280/735 |
| 6,041,658 A | * | 5/2000 | Cassey | 73/714 |
| 6,056,079 A | * | 5/2000 | Cech et al. | |
| 6,089,106 A | * | 7/2000 | Patel et al. | 73/862.582 |

* cited by examiner

Primary Examiner—Robert Raevis
(74) Attorney, Agent, or Firm—Jimmy L. Funke; Robert M. Sigler

(57) ABSTRACT

An improved weight estimation apparatus in which an elastomeric bladder is supported on a semi-rigid backer board which is installed in a vehicle seat between the seat cushion and an underlying spring suspension. The bladder is secured onto the backer board, and the backer board is attached to the seat, enabling proper and consistent placement of the bladder relative to the seat surface. The backer board provides the reaction surface for the bladder, and masks non-uniformities of the seat structure. Additionally, the backer board will reduce or eliminate the effect of objects lying on the floor under the seat, which might otherwise pinch the bladder and produce weight estimation errors. Further, the board tends to protect the bladder from damage due to sharp objects, pinching by the suspension elements, and the effects of wires or cables routed through the seat. The backer board may be smooth to provide a uniform reaction surface, or contoured to increase or decrease sensitivity to weight applied on certain areas of the seating surface.

9 Claims, 4 Drawing Sheets

BLADDER AND SUPPORT STRUCTURE FOR OCCUPANT WEIGHT ESTIMATION

RELATED APPLICATIONS

This application is a continuation-in-part of U.S. Ser. No. 08/923,020, entitled Vehicle Occupant Weight Estimation Apparatus Having Fluid-Filled Seat Bladder, filed Sep. 3, 1997 and assigned to the assignee of the present invention, now U.S. Pat. No. 5,987,370.

TECHNICAL FIELD

This invention relates to detection of occupant weight in a motor vehicle seat based on the pressure in a fluid filled seat bladder.

BACKGROUND OF THE INVENTION

Vehicle occupant detection systems are useful in connection with air bags and other pyrotechnically deployed restraints as a means of judging whether, and how forcefully, to deploy the restraint. One fundamental parameter in this regard is the weight of the occupant, as weight may be used as a criteria to distinguish between an adult and an infant or small child.

One prior weight estimation technique is to install an array of variable resistance pressure sensitive elements in the seat, and to sum the individual pressures to determine occupant weight. A restraint system based on this technique is shown and described in the U.S. Pat. No. 5,474,327, issued on Dec. 12, 1995, and assigned to the assignee of the present invention. In practice, however, such systems tend to be relatively costly to implement, and require a significant amount of signal processing for proper calibration and weight estimation.

It has also been suggested to locate one or more fluid or air filled bladders in a vehicle seat, and to estimate the weight of the occupant based on a measure of the pressure in the bladder(s). However, it has been found that such systems can deliver inconsistent weight estimations because both the seat cushion and underlying suspension, which provide a reaction surface for the bladder, tend to be non-uniform in stiffness. Additionally, it is frequently difficult to properly and consistently install the bladders, and to reliably prevent shifting during use.

SUMMARY OF THE INVENTION

The present invention is directed to an improved weight estimation apparatus in which an elastomeric bladder is supported on a semi-rigid backer board which is installed in a vehicle seat between the seat cushion and an underlying spring suspension. The bladder is secured to the backer board, and the backer board is attached to the seat, enabling proper and consistent placement of the bladder relative to the seat surface. The backer board provides the reaction surface for the bladder, and masks non-uniformities of the seat structure. Additionally, the backer board will reduce or eliminate the effect of objects lying on the floor under the seat, which might otherwise pinch the bladder and produce weight estimation errors. Further, the board tends to protect the bladder from damage due to sharp objects, pinching by the suspension elements, and the effects of wires or cables routed through the seat. The backer board may be smooth to provide a uniform reaction surface, or contoured to increase or decrease sensitivity to weight applied on certain areas of the seating surface. A bladder port passes through an opening in the center of the backer board and is routed to a pressure sensor. A temperature sensor disposed in proximity to the bladder provides a temperature signal, and a controller estimates the weight of the occupant based on the temperature and pressure signals. Preferably, the pressure sensor is configured to sense the gage pressure—that is, the differential pressure between the fluid and atmospheric pressure—at the center of gravity of the bladder fluid in order to provide a stable output independent of changing atmospheric pressure and changing orientation of the bladder due to vehicle pitch and roll.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1A:
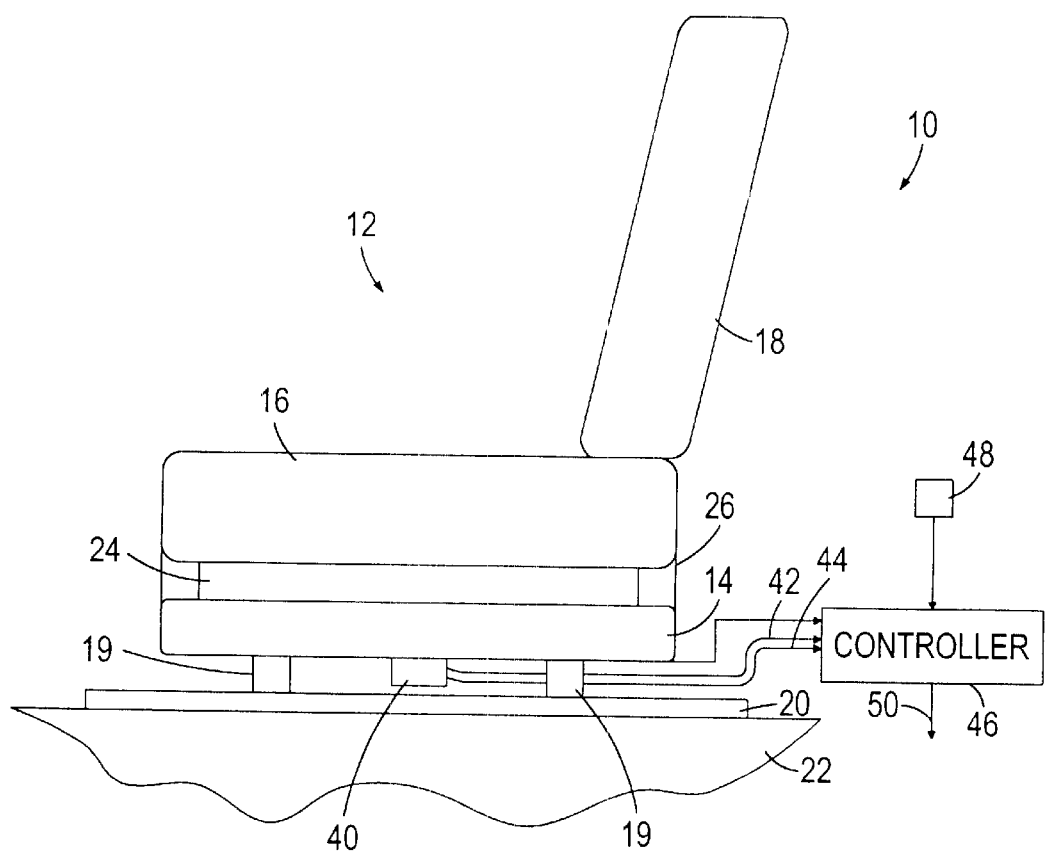
FIG. 1A is a system diagram illustrating a passenger seat of a vehicle equipped with a fluid-filled bladder assembly and a controller for estimating the weight of a seat occupant in accordance with this invention.
Figure 1B:
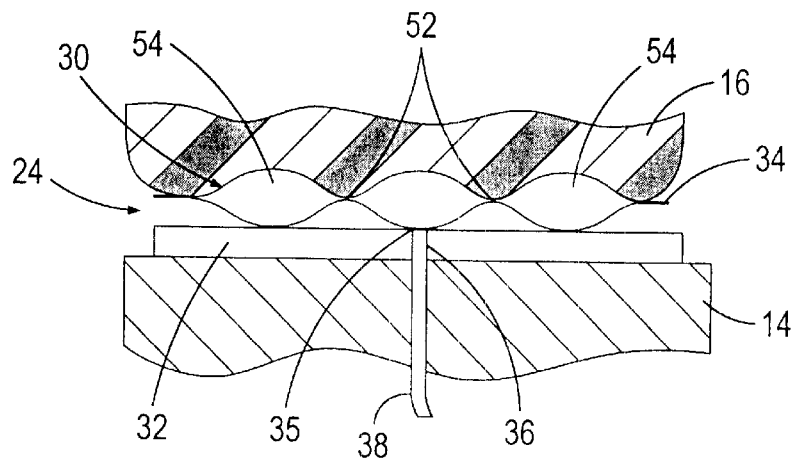
FIG. 1B is an enlarged view of a portion of FIG. 1A, illustrating the fluid-filled bladder assembly in cross-section.

Referring to the drawings, and particularly to FIG. 1A, the reference numeral 10 generally designates a vehicle occupant weight estimation apparatus according to this invention. The vehicle seat, generally designated by the reference numeral 12, includes a rigid frame and spring suspension 14, a bottom foam cushion 16 and a back foam cushion 18. A set of posts 19 integral to the frame 14 attach the seat 12 to pair of tracks 20 (only one of which is shown in FIG. 1A), which in turn, are secured to the vehicle floor 22. A bladder assembly 24, shown in more detail in FIG. 1B, is sandwiched between the bottom cushion 16 and the suspension elements of frame 14 for the purpose of detecting the presence and weight of an occupant of seat 12, as explained below. Finally, a fabric cover 26 envelopes the cushion 16, bladder assembly 24 and frame 14.

Referring to FIG. 1B, the bladder assembly 24 comprises a polymeric bladder 30 in contact with the bottom cushion 16, and a semi-rigid backer board 32 in contact with the frame 14. Additionally, a felt pad may be inserted between the backer board 32 and frame 14, as described below in reference to FIGS. 2 and 3A–3B. The bladder 30 has a continuous weld 34 about its periphery and contains a fluid such as silicone which is non-corrosive, and not subject to freezing or break-down at extreme ambient temperatures. A bladder exit port 35 located approximately at the center of weight of the fluid is coupled to a tube 38, which passes through an aperture 36 in the backer board 32 (and felt pad, if used). The tube 38 is coupled to a pressure sensor 40, which may be attached to the lower portion of frame 14 as shown in FIG. 1A, the sensor 40 developing an electrical signal on line 42 that is representative of the fluid pressure in the bladder 30. A temperature sensor (not shown), which may be integrated with the pressure sensor 40, provides an electrical output signal on line 44 indicative of the bladder and foam temperature. The pressure and temperature signals on lines 42 and 44 are applied as inputs to an electronic controller 46 which determines if the seat 12 is occupied and estimates the weight of the occupant based on the pressure and temperature signals, possibly in combination with other inputs, such as an atmospheric pressure signal provided by pressure sensor 48. If the controller 46 is attached to the bottom of frame 14, the pressure and temperature sensors may be conveniently packaged within the controller housing. In any event, controller 46 produces an electrical output signal indicative of the weight estimation on line 50, which may be used, for example, as a factor in determining whether and how forcefully to deploy air bags or other pyrotechnically deployed restraints in a crash event. The controller 46 may be mechanized with a suitably programmed microprocessor, as described below in reference to FIGS. 5–6.

In general, the fluid in bladder 30 has a nominal or unloaded pressure which provides a baseline pressure measurement, and the pressure increases monotonically with occupant weight applied to the seat cushion 16. The temperature measurement is used to compensate the weight measurement for temperature dependent changes in foam and bladder stiffness to provide a weight measurement that is insensitive to temperature variations. Preferably, the pressure sensor 40 is configured to sense the differential or gage pressure of the fluid—that is, the pressure difference between atmospheric pressure and bladder fluid pressure—in order to provide a pressure measurement that is insensitive to atmospheric pressure variations due to changing weather patterns or altitude. In this case, the pressure sensor 40 includes a second inlet (not shown) open to atmospheric pressure. Alternately, the sensor 40 may provide an absolute pressure measurement of the bladder fluid, and the controller 46 may compensate the measurement for atmospheric pressure variations by reducing the fluid pressure measurement by the atmospheric pressure measurement provided by sensor 48.

In general, the bladder 30 conforms in size to the seat cushion 16. Additionally, the upper and lower surfaces of the bladder 30 may be welded together in various patterns, as indicated by the reference numeral 52 in FIG. 1B, so as to divide the bladder 30 into a series of contiguous cells 54. The welds 52 are not continuous so that fluid can freely flow between adjacent cells. The array of cells 54 minimizes the amount of fluid required to detect occupant weight, thereby minimizing the weight of the fluid-filled bladder 30, and prevents the fluid from pooling in proximity to an unloaded area of the seat cushion 16. As shown in the exploded view of FIG. 2, the cells may be defined by a pattern of spot welds 52 extending over the entire surface of the bladder 30, with the exit port 35 positioned in the center of one of the cells substantially at the center of gravity of the fluid. Preferably, the spot welds 52 are patterned so that the cells 54 assume a generally circular or domed shape, as illustrated in FIGS. 1B and 3A–3B. The domed shape of the cells 54 essentially eliminates vertical wall surfaces within the bladder 30, thereby maximizing the measured pressure response to the weight of an occupant.

The sizes of the individual spot welds 52 and cells 54 are preferably chosen to minimize the weight of the fluid filled bladder 30 while maximizing the sensitivity and accuracy of the weight measurement. That is, the cell pattern can be designed to influence the sensitivity of the pressure signal to weight applied in certain areas of the seat cushion 16. However, the geometry of the seat cushion 16, the suspension 14 and other elements (such as wires and connectors) routed through the seat materials can also influence the pressure signal. Although these affects could possibly be compensated for through a careful design of the cell patterns, such an approach is impractical due to seat-to-seat variations in stiffness, variations in the location of wires and connectors, etc. Additionally, it can be difficult to precisely position the bladder 30 when the seat 12 is initially assembled, and once assembled, to prevent it from shifting, as shifting would defeat the compensation provided by the cell patterns. The present invention addresses these concerns through the incorporation of the-semi rigid backer board 32 between the bladder 30 and the frame 14. The backer board 32 provides a firm and predetermined reaction surface for the bladder 30, and also facilitates accurate and repeatable positioning of the bladder 30 in the seat 12. The backer board 32 is positioned relative to the frame, an the bladder 30, in turn, is firmly secured to the backer board 32, thereby ensuring precise and secure positioning of the bladder 30 as well.

Figure 2:
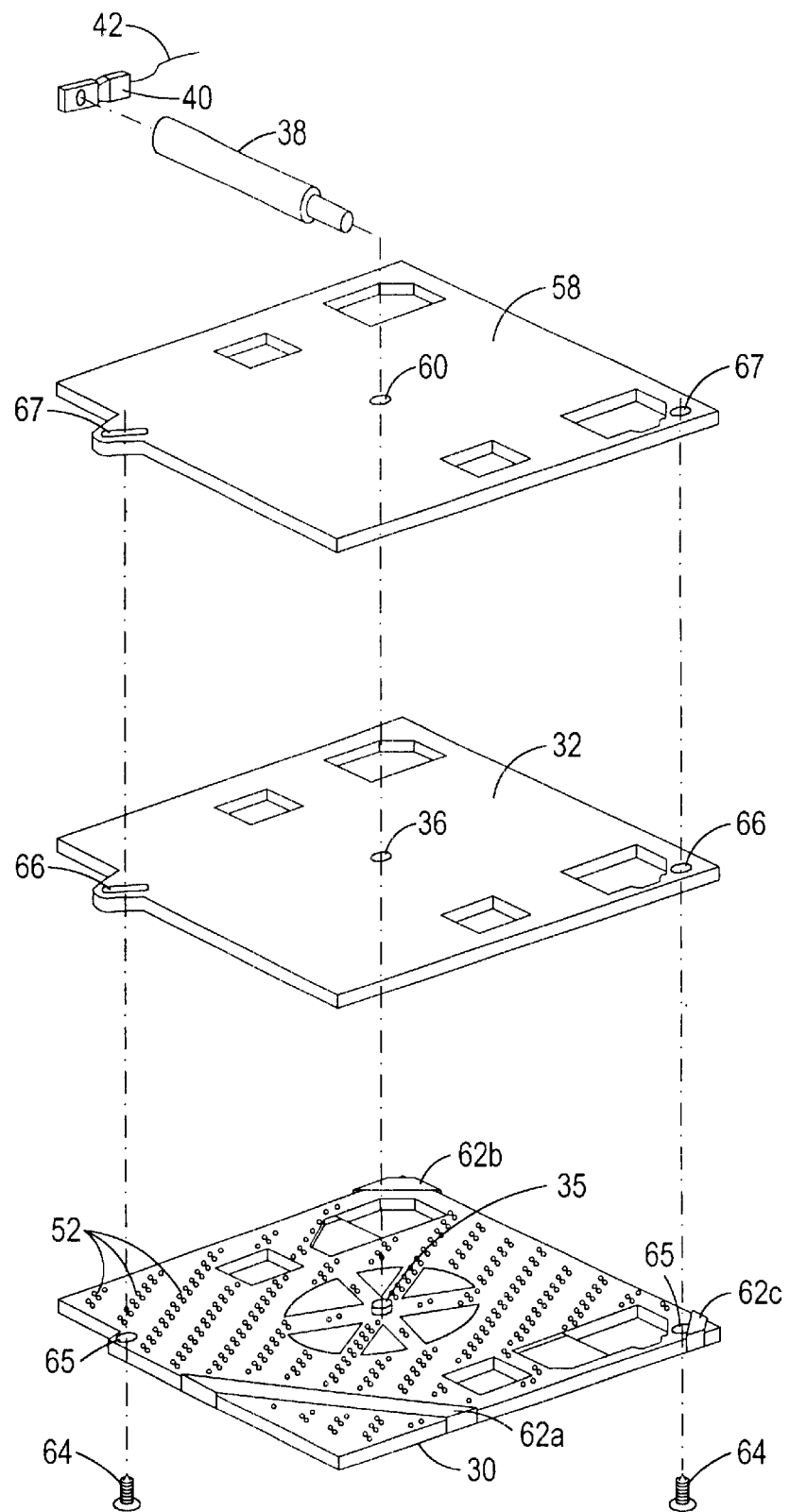
FIG. 2 is an exploded view of the fluid-filled bladder assembly of FIGS. 1A–1B, including a pressure sensor, a felt pad, a backer board and a fluid-filled bladder.
Figure 3A:
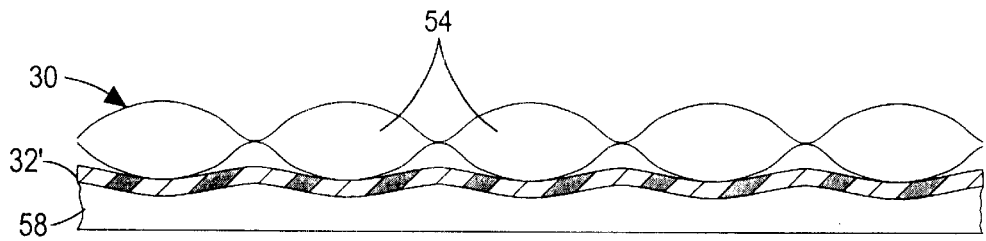
FIGS. 3A and 3B depict contoured backer boards in accordance with an aspect of this invention.
Figure 3B:
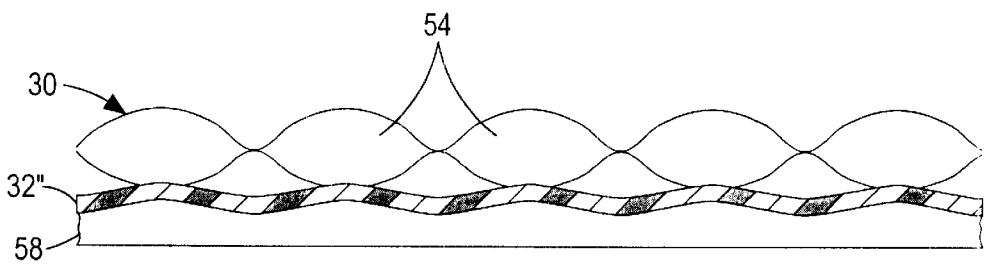

FIG. 2 depicts an exploded, bottom-side-up, view of the bladder assembly 24, in a preferred implementation comprising the bladder 30, the backer board 32 and a felt pad 58. The tube 38 passes through openings 60, 36 in the pad 58 and backer board 32, and attaches to the exit port 35 of bladder 30, as explained below in reference to FIGS. 4A–4B. The other end of tube 38 is coupled to the pressure sensor 40, which provides the pressure output signal on line 42, as described above in reference to FIG. 1A. The felt pad 58 is included primarily for noise suppression, and to provide cushioning between the backer board 32 and any wires (not shown) passing between the frame-suspension 14 and the backer board 32.

In the embodiment of FIG. 2, a set of elastic straps 62a–62c are bonded or sewn to the periphery of the bladder 30 for the purpose of mutually securing the bladder 30, the backer board 32 and the felt pad 58. That is, the respective corners of backer board 32 and pad 58 are inserted under the straps 62a–62c so that the elements shown in FIG. 2 can be conveniently handled as one assembly. Alternatively or additionally, the backer board 32 and pad 58 may be attached with a suitable adhesive applied to the respective elements, or the pad 58 and backer board 32 may be sewn to peripheral portions of the bladder 30. In any event, the assembly comprising the bladder 30, backer board 32 and pad 58 is then attached to the seat frame 14, for example by the push-pins 64 which pass through suitable openings 65, 66, 67 therein, and attachment openings (not shown) provided in the frame 14.

FIGS. 3A and 3B illustrate that the backer board 32 may be contoured to influence the sensitivity—that is, th change of the pressure signal per unit change in the weight applied to the seat cushion 16. In FIG. 1B, the backer board 32 is flat, and provides a uniform reaction surface for the bladder 30. In FIGS. 3A and 3B, however, the backer board is contoured in axial alignment with the pattern of cells 54. In FIG. 3A, the backer board 32' is contoured to provide a concave surface feature under the center of the cells 54; this causes a decrease in the sensitivity, compared to the flat backer board 32. In FIG. 3B, the backer board 32" is contoured to provide a convex surface feature under the center of the cells 54; this causes an increase in the sensitivity, compared to the flat backer board 32. Of course, the degree of convexity or concavity can be varied depending on the application, as can the pattern of surface features. For example, it may be desired to use concave surface features in proximity to the center of the bladder 30 since the sensitivity is typically highest for occupant weight applied to the center of the seat cushion 16; in this case, the degree of concavity may be reduced with increasing distance from the center position. On the other hand, it may be desired to use convex surface features near the periphery of the bladder 30 to increase sensitivity to weight applied to the edges of the seat cushion 16. The most useful pattern for a given seat and/or desired sensitivity may be determined either experimentally or by conventional data mapping techniques. In any event, it will be appreciated that having the ability to control the contour of the backer board 32 significantly improves the ability of the designer to achieve the desired pressure vs. weight transfer function of the system. Once designed, the contoured backer board may be easily and economically manufactured by vacuum forming.

Figure 4A:
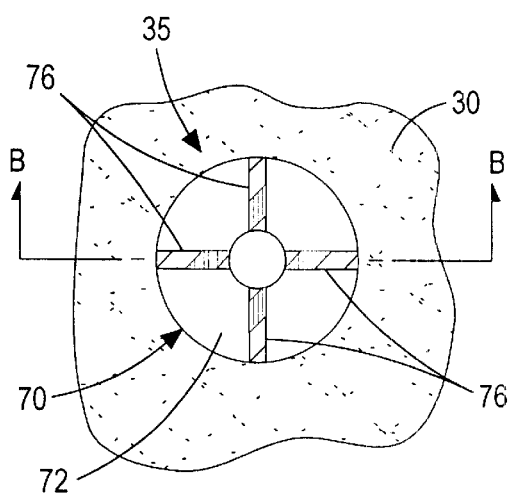
FIGS. 4A and 4B depict an exit port of the bladder of FIGS. 1A–1B.
Figure 4B:
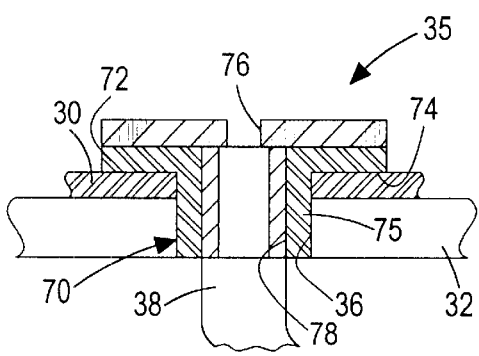

FIGS. 4A–4B depict the exit port 35 of bladder 30. As viewed from inside the bladder 30 in FIG. 4A, and in cross-section in FIG. 4B, the port 35 includes a generally cylindrical plastic inlet 70 having a shoulder 72 that seats on an inner surface of the 74 of the bladder 30, a stem 75 that extends through the opening 36 in backer board 32, and a number of radial extending bosses 76 that protrude into the bladder 30. The inlet 70 has a central bore 78 that receives the pressure sensor tube 38, as shown in FIG. 4B. The bosses 76 ensure open fluid communication between the bladder fluid and the tube 38 at all times.

Figure 5:
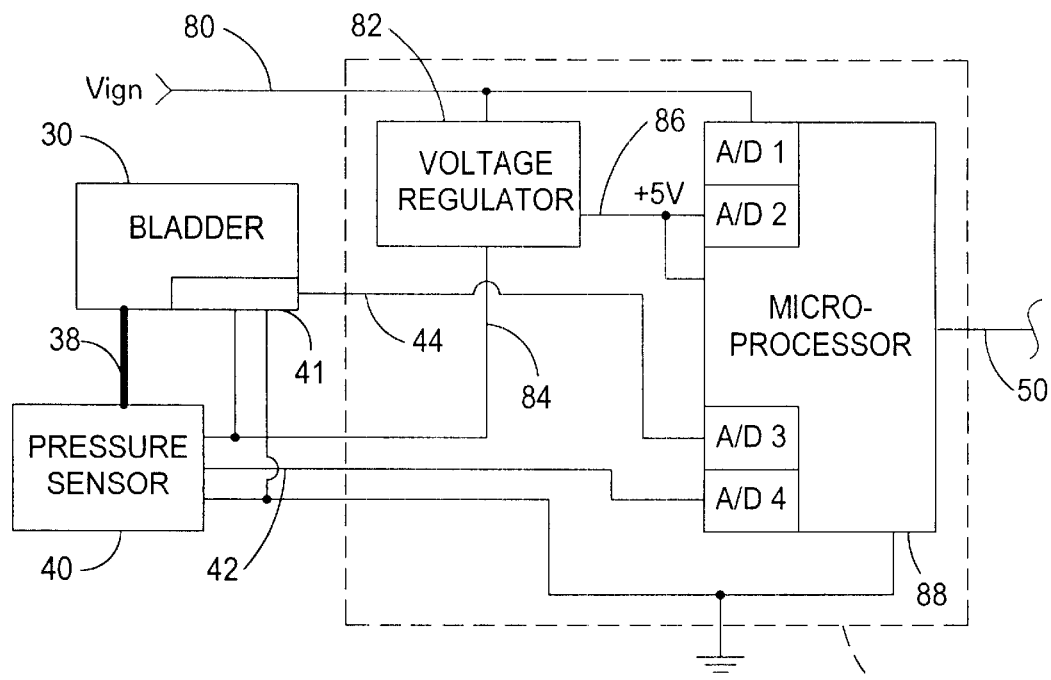
FIG. 5 is a block diagram of the controller of FIG. 1A, in the context of an air bag deployment system.

FIG. 5 depicts the occupant weight estimation apparatus 10 in the context of an air bag deployment system in which the controller 46 provides an output signal on line 50 indicating whether deployment should be inhibited or allowed based on sensed occupant weight. Vehicle ignition voltage Vign, which may be +12 VDC, is supplied to controller 46 via line 80, and an internal voltage regulator 82 provides a regulated system voltage of +5 VDC on lines 84 and 86. The system and ground voltages are supplied to source voltage terminals of the pressure sensor 40, the temperature sensor 41 (which may be a thermistor), and a microprocessor 88. The microprocessor 88 has four analog-to-digital input channels A/D1–A/D4 which receive the ignition voltage Vign, the system voltage of voltage regulator 82, the temperature sensor output voltage on line 44, and the pressure sensor output voltage on line 42.

Figure 6:
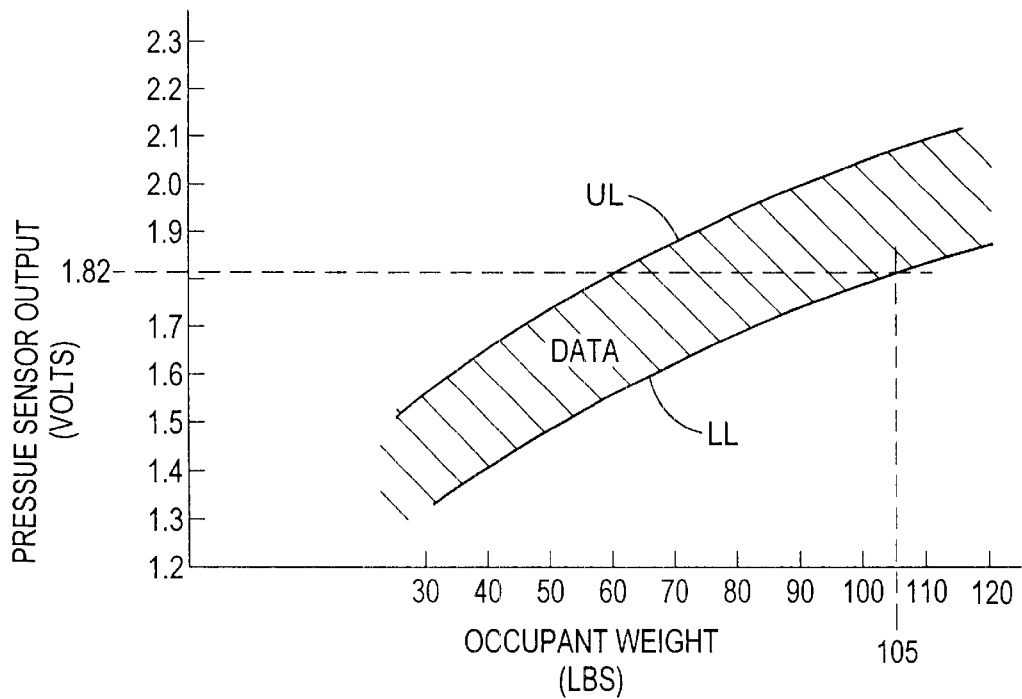
FIG. 6 is a graph depicting pressure sensor output voltage as a function of occupant weight, as used in the system of FIG. 5.

Based on the above-described inputs, the microprocessor 88 determines the occupant weight, and based on predetermined criterion, whether air bag deployment should be inhibited or allowed. In the illustrated control strategy, air bag deployment is to be inhibited for occupants below a predetermined weight, referred to herein as the threshold weight. In general, once the occupant weight estimation system 10 is installed in a vehicle, the relationship between occupant weight and sensed pressure (compensated for system voltage variations) is empirically determined at a variety of temperatures. In a system as suggested in FIG. 1A, the data can be used to construct either a mathematical model or a multi-dimensional look-up table of occupant weight as a function of temperature and pressure sensor output voltage, with the model or table programmed into the microprocessor 88 and used to determine and output the occupant weight on line 50. In the system of FIG. 5, however, the output merely indicates whether the occupant is above or below the threshold weight, within the system tolerance constraints. In this case, the empirically determined data may be plotted as shown in FIG. 6, and used to develop a pressure sensor threshold voltage for determining whether deployment should be inhibited or allowed. For the data represented in FIG. 6, for example, the lines designated as upper limit UL and lower limit LL bound the pressure sensor output voltage variability for any given occupant weight. In the illustrated example, the lower limit LL defines a threshold voltage which is the minimum voltage, approximately 1.82 volts, one would expect to see for an occupant having a standing weight of 105 lbs. It should be understood that the simple control described above is exemplary in nature, and could be modified to include adaptive updating of the thresholds, or to provide a more precise output as described above in reference to FIG. 1, for example.

In summary, the present invention provides an improved occupant weight estimation apparatus including a fluid filled bladder 30 and a semi-rigid backer board 32. The backer board 32 enables proper and consistent placement of the bladder 30 relative to the seat cushion 16, and provides a known reaction surface for the bladder 30 that shapes the sensitivity and masks non-uniformities of the seat structure. Additionally, the backer board 32 reduces or eliminates the effect of objects lying on the floor under the seat 12, which might otherwise pinch the bladder 30 and produce weight estimation errors.

While this invention has been described in reference to the illustrated embodiment, it should be understood that various modifications will occur to persons skilled in the art. For example, in certain applications, it may be desirable to include a semi-rigid board between the bladder 30 and seat cushion 16 to mask non-uniformities of the seat cushion 16; in this case, the board can also be used to control sensitivity as described above, and to protect the bladder 30 from puncture due to sharp objects penetrating the seat cushion 16. In other applications, the upper surface of the frame 14 may be smooth and rigid, and the bottom backer board 32 may be omitted. Thus, many variations are possible depending on the application, and it will be understood that any of a number of systems may fall within the scope of this invention, which is defined by the appended claims.

What is claimed is:

1. Apparatus for estimating the weight of an occupant of a seat in a motor vehicle, the seat having a bottom cushion supported by a frame, the apparatus comprising:

a bladder assembly sandwiched between the bottom cushion and the frame, including a fluid-filled bladder, a semi-rigid backer board interposed between the bladder and the bottom cushion or frame, and a plurality of elastic straps affixed to the bladder for securing the bladder to the backer board, the backer board being secured to the seat, a pressure sensor coupled to an exit port of said bladder for sensing a pressure of the fluid in said bladder; and a controller for estimating the weight of the occupant based on the sensed fluid pressure.

2. The apparatus of claim 1, wherein the backer board is disposed between the bladder and the seat frame so that the backer board, masks surface irregularities of the seat frame.

3. The apparatus of claim 2, wherein the bladder assembly includes a felt pad disposed between the backer board and the seat frame.

4. The apparatus of claim 1, wherein the backer board is disposed between the bladder and the bottom cushion so that the backer board masks surface irregularities of the bottom cushion.

5. The apparatus of claim 1, wherein the backer board is flat to provide a uniform reaction surface in contact with the bladder.

6. The apparatus of claim 1, wherein the backer board is contoured to provide a contoured reaction surface in contact with the bladder for controlling a sensitivity of the sensed fluid pressure to the occupant weight.

7. Apparatus for estimating the weight of an occupant of a seat in a motor vehicle, the seat having a bottom cushion supported by a frame, the apparatus comprising:

a bladder assembly sandwiched between the bottom cushion and the frame, including a fluid-filled bladder comprising a pattern of cells and a semi-rigid backer board interposed between the bladder and the bottom cushion or frame, the bladder being affixed to the backer board, and the backer board being contoured with axial alignment with the cells and secured to the seat;

a pressure sensor coupled to an exit port of said bladder for sensing a pressure of the fluid in said bladder; and a controller for estimating the weight of the occupant based on the sensed fluid pressure, where the contour of the backer board controls a sensitivity of the sensed fluid pressure to the occupant weight.

8. The apparatus of claim 7, wherein the backer board is contoured to form a concave reaction surface in alignment with at least one of said cells, thereby to decrease the sensitivity of the sensed fluid pressure to occupant one cell.

9. The apparatus of claim 7, wherein the backer board is contoured to form a convex reaction surface in alignment with at least one of said cells, thereby to increase the sensitivity of the sensed fluid pressure to occupant weight acting on said at least one cell.

* * * * *